Patented July 19, 1932

1,867,824

UNITED STATES PATENT OFFICE

FRED V. HAMMERLY, OF BERKELEY, CALIFORNIA, ASSIGNOR OF ONE-HALF TO GEORGIA A. HAMMERLY AND ONE-HALF TO CARROLL B. ABBOTT, BOTH OF BERKELEY, CALIFORNIA

APPARATUS FOR MIXING FLUIDS

Application filed August 18, 1930. Serial No. 475,928.

My invention relates to an apparatus for mixing fluids, and particularly to such an apparatus for mixing liquids and gases.

It is among the objects of my invention to provide an apparatus in which controlled amounts of a gas are thoroughly mixed with a liquid.

Other objects of my invention include the provision of an apparatus in which a liquid is repeatedly moved in an agitated stream, into which a gas is injected; thereby maintaining the liquid in a state of complete saturation with the gas at all times.

A further object of my invention is to provide an apparatus which will expedite the biological purification of sewage.

The invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claim.

Referring to the drawing:

Figure 1 is a horizontal sectional view of the apparatus embodying my invention, taken in a plane indicated by the line 1—1 of Figure 2; and Figure 2 is a vertical sectional view of the same, taken in a plane indicated by the line 2—2 of Figure 1.

In the following description the apparatus for mixing fluids embodying my invention will be described in connection with the aeration of sewage. It is understood, however, that this particular application of the apparatus is merely taken for the purposes of illustration, and that the apparatus may be used to equal advantage for effecting the mixture of other fluids.

Of all the methods which have been used for the purification of sewage, that of biochemical decomposition or bacterial purification has proved to be most effective. This method is not without its disadvantages, however, due to the slow rate at which the bacteria normally do their work, and the large volumes of raw sewage which have to be treated. When the apparatus for mixing fluids embodying my invention is used in this connection the sewage is maintained in a state of complete saturation with oxygen at all times, and the biological purification is carried on under the most favorable conditions. As a result, large volumes of sewage may be treated in a plant of relatively small size.

In terms of broad inclusion, the apparatus for mixing fluids embodying my invention comprises a tank for receiving a liquid such as sewage. Means are provided for initiating an upwardly moving stream within the tank to circulate and agitate the liquid; and means are provided for introducing a gas, such as air, into the stream. Means are also provided for distributing the mixed fluids on the surface of liquid in the tank; and means are provided for removing a liquid, such as the purified sewage, from the tank.

In greater detail, the apparatus for mixing fluids embodying my invention comprises a tank 2, which may conveniently be made of concrete, having a basin-shaped bottom. Extending across the top of the tank 2 are a pair of girders 3 supporting a platform 4, upon which is mounted a vertical shaft motor 6.

Located centrally of the tank is an inverted funnel 7, preferably arranged so that its neck 8 is positioned adjacent the center of the tank. The funnel is secured to the tank bottom, and is spaced therefrom by a series of legs 9 to provide an opening 11. The throat end of a Venturi tube 12 is connected with the funnel neck 8, and the tube extends upwardly and opens adjacent the top of the tank below the normal level of the tank liquid or sewage sludge 13.

Means are provided for initiating a movement in the sludge, to produce an upwardly moving stream directed thru the funnel 7 and

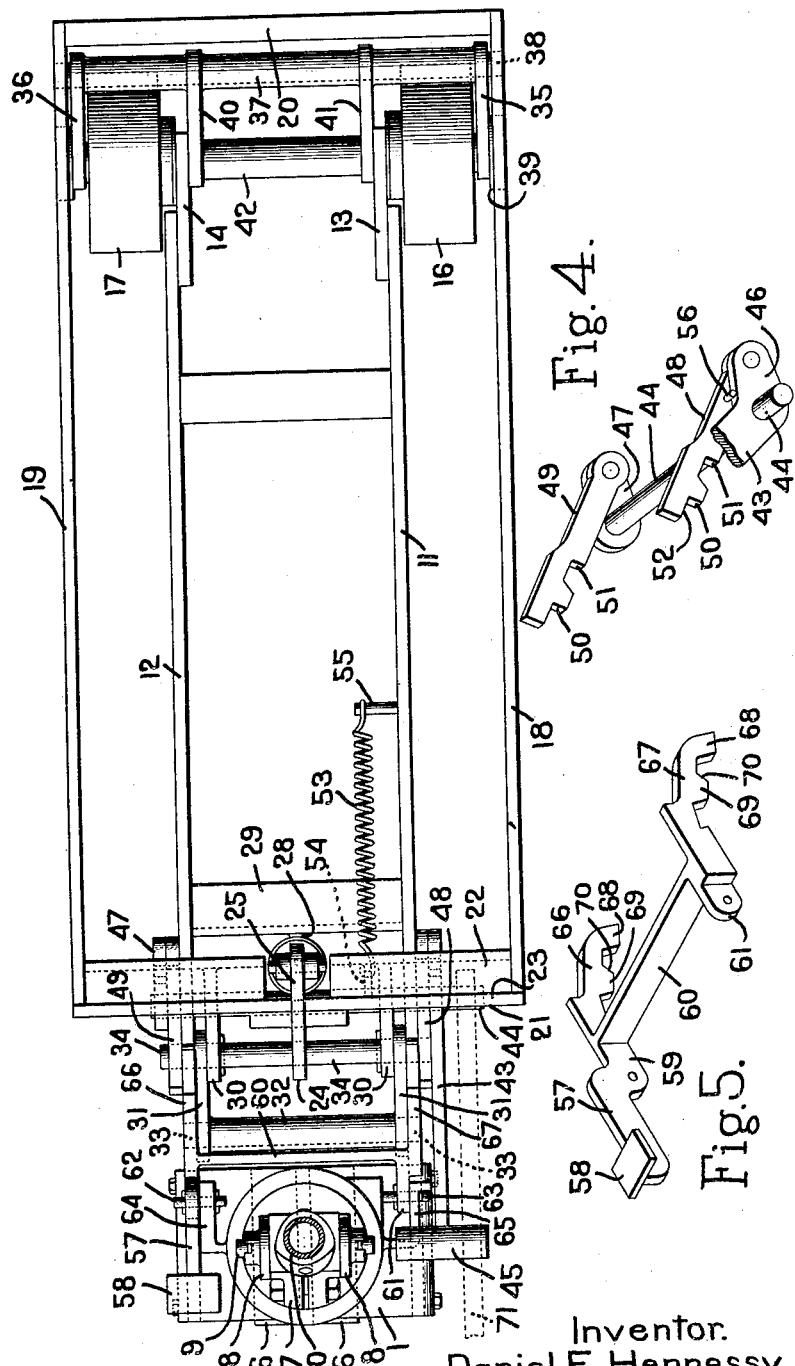

Patented July 19, 1932

1,867,825

UNITED STATES PATENT OFFICE

DANIEL E. HENNESSY, OF WATERTOWN, MASSACHUSETTS, ASSIGNOR TO LEWIS-SHEPARD COMPANY, OF WATERTOWN, MASSACHUSETTS, A CORPORATION OF MASSACHUSETTS

PEDAL ACTUATED ELEVATING TRUCK

Application filed June 20, 1929. Serial No. 372,372.

This invention relates to improvements in elevating trucks in which means are provided for raising and lowering the load supporting means so that the truck may be introduced beneath the platform supporting the articles to be transported, or beneath the article itself, and the load supporting means thereupon raised a sufficient distance to remove the platform or article from the floor, and thereby enabling the same to be transported by the truck and deposited in a desired place by lowering the load supporting means of the truck.

The principal object of the invention is to provide an improved means for raising the load supporting means.

The load supporting means of elevating trucks of the type above described have heretofore been raised by mechanism operated by a downward swinging movement of the tongue from approximately vertical position to substantially horizontal position. In operating such constructions the operator is required to pull forwardly upon the tongue while placing his foot against the front end of the truck to prevent forward movement thereof. As a consequence the power which he is enabled to apply to the tongue is greatly limited with respect to that which would be applied if he were able to throw his full weight upon the tongue when the latter is in an advantageous lifting position.

In usual types of elevating trucks the load supporting means is carried upon parallel links, or the equivalent thereof, and during the initial lifting movement the pivots for the upper ends of the parallel links move through a portion of an arc which is approximately vertical, while during continued movement the path of movement of the pivots approach the horizontal. As a consequence, the leverage required during the initial lifting movement is very much greater than that which is required during the continued lifting movement. Furthermore, the frictional resistance of the relatively movable parts of the mechanism is much greater at the starting of the lifting movement than during the continuation thereof. In order, therefore, to enable the operator to lift a heavy load, it has been necessary to employ a tongue of the maximum length which can be efficiently actuated by operators of usual size and weight.

When such a tongue is in a raised position approximating a vertical position, the usual horizontal handles of the tongue are approximately at the height of the shoulders of the operator, so that the power which the operator can apply to start the lifting of the load supporting means, where the greatest resistance is offered, is much less than that which may be applied by him as the tongue sufficiently approaches horizontal position to enable him to bear his weight upon it.

It is obvious that the force applied to a movable object by the momentum of the weight of a moving body greatly exceeds the static force of the same weight when imposed upon the object.

The principal object of the present invention is to provide an elevating truck with lifting mechanism for the load supporting means operable by a lifting lever having means so positioned as to permit the operator to project his full weight upon it, whereby the initial lifting force, applied by the momentum of the full weight of the operator to start the lifting mechanism from a position of rest, will greatly exceed that which would be produced by the static application of the weight of the operator alone, while the lifting movement will thereafter be effectively continued by the weight of the operator, by reason of the more advantageous positions of the lifting mechanism, so that heavy loads can be lifted without undue exertion upon the part of the operator.

A further object of the invention is to provide means for applying the lifting force symmetrically with respect to the longitudinal axis of the load supporting means, thereby preventing racking of the load supporting means which usually is in the form of a rectangular frame.

A further object of the invention is to provide an elevating truck having load supporting means mounted upon parallel links, or equivalent devices, which cause the load supporting means to be elevated by a longitudinal movement thereof, with a foot operated lifting lever fulcrumed below and preferably beneath the load supporting means, and provided with means operable upon depression of the lever to exert a thrust upon an end of the load supporting means at such angle to the horizontal that the lever will act both directly to lift the load supporting means and to move it longitudinally.

A further object of the invention is to provide an elevating truck with a foot-operated lifting lever fulcrumed below the load supporting means and having means to exert a lifting thrust upon the load supporting means at points substantially equidistant from the longitudinal center of the load supporting means, thereby increasing the rigidity of the lifting mechanism and avoiding twisting strains.

A further object of the invention is to provide an elevating truck of the character above described having a foot lever operable to elevate the load supporting means step by step.

A further object of the invention is to provide an improved means for locking the load supporting means when the load supporting means is in a predetermined elevated position, or in predetermined elevated positions.

Another object of the invention is to provide locking means having a plurality of locking dogs operable to engage the load supporting means at points substantially equidistant from the longitudinal axis of the load supporting means, whereby racking strains will be avoided both upon release of the elevating means and during the transportation of the loaded truck.

A further object of the invention is to provide an elevating truck in which the load supporting means is mounted upon parallel links with a foot-operated lever for lifting the load supporting means, having pawls provided with a plurality of teeth positioned to engage extensions of the pivots of the upper ends of the links, and a further object of the invention is to provide a locking device having a plurality of locking dogs positioned also to engage the pivotal connection of the parallel links at approximately equal distances from the longitudinal center of the load supporting means.

Another object of the invention is to provide an elevating truck of the character above described provided with a substantially vertical dash pot to cushion the downward movement of the load supporting means when released from elevated position.

Another object of the invention is to provide an elevating truck of the character described having a relatively narrow main frame provided at its front end with a steering head, and at its rear end with an axle having the rear wheels mounted at the outside of the frame, and comprising a load supporting means which is of considerably greater width than the width of the main frame.

A further object of the invention is to provide an elevating truck of the character specified of great rigidity and higher efficiency and which can be economically constructed.

These and other objects and features of the invention will more fully appear from the following description and the accompanying drawings and will be particularly pointed out in the claims.

In the drawings:

Fig. 1 is a side view of an elevating truck embodying a preferred form of the invention;

Fig. 2 is a detail side view illustrating the front portion of the truck as viewed form the opposite side, the handle and rear portion of the truck being omitted;

Fig. 3 is a plan view of the elevating truck illustrated in Fig. 1;

Fig. 4 is a detail view in perspective showing the lifting pawls and their connection to the lifting lever; and Fig. 5 is a detail view in perspective of the locking device.

The elevating truck embodying the invention comprises a load supporting means, which preferably is in the form of a rectangular skeleton frame so supported as to be raised upon longitudinal movement thereof, with a foot lever for raising the load supporting means having means operable to engage one end, preferably the front end, of the load supporting means from beneath, and upon downward movement of the foot lever to exert an upward and longitudinal thrust upon it, with means for locking the load supporting means in a predetermined elevated position, or predetermined elevated positions.

In the particular construction illustrated the elevating truck comprises a head 1, which desirably is in the form of an arch having mounted centrally therein a steering post 2 provided at its lower end with a yoke having arms 3 with bosses 4 at their lower ends in which the axle 5 of a steering wheel, or plurality of steering wheels 6, is mounted. The upper end of the steering post has secured to it a split collar 7 provided with upwardly extending ears 8 in which is mounted a shaft 9 which forms the pivot of a vertically swinging steering tongue 10. The steering tongue 10 is provided at its lower end with an extension which engages the upper end of the split collar 7 thereby preventing the tongue from being moved any considerable distance beyond a vertical position and holding the tongue in upraised position.

Side bars 11 and 12, which are suitably secured at their front ends to the head 1 by bolts, rivets, or by welding, extend rearwardly from said head, preferably in parallelism, and are provided respectively with preferably offset ends or brackets 13 and 14 in which the rear axle 15 of the truck is mounted. The head and side bars forming the frame may be relatively narrower than usual types of trucks and the rear wheels 16 and 17 are rotatably mounted on said axle outside of the side bars 12 and 13 of the frame, thus providing a wide wheel support for the rear end of the truck.

The load supporting means, which, as illustrated, is in the form of a rectangular skeleton frame, but which may of course be provided with a floor, is supported upon the frame by parallel links. In the preferred construction illustrated the load supporting means comprisess parallel side bars 18 and 19 located outside of the rear wheels 16 and 17 connected at their rear end by a transverse bar or girder 20 preferably in the form of a channel bar, and at their front ends connected by a rigid head 21, preferably having a horizontal flange 22 and a vertical web or flange 23 provided with an upwardly extending standard 24 having at its upper end a rearwardly extending arm 25 adapted to be connected to the piston 26 of a substantially vertical dash pot 27, the lower end of which is pivotally connected to a bracket 28 upon a cross girder 29 of the main frame.

The head 21 of the load supporting means is also provided with forward extensions 30 which carry the pivots for the upper ends of the front pair of parallel links 31. Desirably the lower ends of the front pair of links 31 are fixedly secured, as by welding, to a sleeve 32 which is rotatably mounted upon a shaft 33, the ends of which are mounted in depending portions of the side bars 11 and 12 of the frame, or in brackets depending therefrom. The upper ends of the links 31 are pivotally mounted, preferably upon a rod 34 which desirably is rotatably mounted in the extensions 30 of the head of the platform, and may also be mounted in a depending portion of the standard 24. The pivots for the upper end of the link, or in other words the pivotal rod 34, extend well beyond the links, and such extensions in the preferred construction illustrated are engaged by the lifting mechanism and preferably also by the locking mechanism as will hereinafter more fully appear.

The parallel link, which raises the rear end of the load supporting means, as illustrated herein, is of very rigid construction, and comprises a pair of outer links 35 and 36 which are rigidly connected, as by welding, at their upper ends to a sleeve 37 which is rotatably mounted upon a shaft 38, the ends of which extend through and preferably are welded to the side bars 18 and 19 of the load supporting means. The lower ends of the links 35 and 36 are pivotally mounted upon the rear axle 15 and desirably are provided with outwardly extending bosses 39 which underlie the side bars 18 and 19 respectively of the load supporting means and support the rear end of said load supporting means when it is in lowered position.

Other links 40 and 41, which are rigid with and preferably welded at their upper ends to the sleeve 37, are rigidly connected at the lower ends to a sleeve 42 which is rotatably mounted upon the axle 15, the links 40 and 41 being preferably so positioned that they engage the inner faces of the offset extensions 13 and 14 of the side bars 11 and 12 of the main frame.

The lifting and locking mechanism which are the more prominent features of the invention comprise a foot lever which is fulcrumed below and preferably beneath the front end of the load supporting means having a long arm provided with a pedal and a relatively short arm which acts directly through upwardly inclined thrust members to apply a lifting force upwardly and forwardly to raise the end of the load supporting means. The thrust members desirably engage the extended pivots of the upper ends of the forward parallel links at equal distances from the longitudinal axis of the load supporting means, thereby exerting forces upon the load supporting means which avoid subjecting the load supporting means to twisting or racking strains. Desirably these thrust members are in the form of pawls having a plurality of shoulders to engage the pivot extensions, so that the load supporting means may be raised step by step.

The locking device desirably is foot operated and comprises dogs having teeth positioned to engage the extensions of the pivots for the upper ends of the parallel links at equal distances from the longitudinal axis of the load supporting means, thus avoiding the application of twisting or racking strains upon the load supporting means and main frame when the load supporting means is locked in elevated position.

In the particular construction described the lifting lever is in the form of a foot lever 43 which is fixedly secured, as by welding, to a transverse shaft 44 which is rotatably mounted in suitable bearings in the depending portions of the side frames 11 and 12. The long arm of the lever 43 is provided at its front end with a pedal 45 so located that the operator may readily throw his full weight upon it particularly while grasping the tongue to steady himself when the tongue is in the vertical position illustrated in Fig. 1. The lifting lever has a short arm 46 which preferably is integral with it and extends at an angle to the longitudinal axis of the long arm of the lever. The shaft 44 has secured to it at its opposite end a short arm 47 which is parallel to and of equal length to the short arm 46. Pawls 48 and 49 are pivotally connected at their lower ends to the arms 46 and 47 and are provided with teeth presenting shoulders 50 and 51. The under faces 52 of the pawls normally engage end portions of the rod 34 which forms the pivot for the upper ends of the front parallel links 31.

Resilient means, such as a spring 53, which is connected at one end to an arm 54 upon the shaft 44 and at its other end to a stud 55 upon the main frame, serves normally to hold the foot lever 43 in elevated position, and studs 56 extending outwardly from the pawls 48 and 49 are adapted to be engaged by the short arms of the lever in such a manner as to hold the pawls in elevated position out of the path of the ends of the shaft 34 during the lowering of the load supporting means from elevated position.

The preferred form of locking mechanism illustrated herein comprises an integral foot lever 57, (see Figs. 3 and 4) having at its front end a pedal 58 and a downwardly offset portion 59 connected by a cross bar 60 to a forwardly extending arm 61 which is parallel to the offset portion 59. The members 59 and 61 are pivotally mounted upon studs 62 and 63 which extend respectively from bosses 64 and 65 upon the head 1. Locking dogs 66 and 67, which are integral with the foot lever 57 and its cross bar 60, extend rearwardly and are provided with a plurality of teeth 68 and 69 adapted to engage the extensions of the rod 34 which constitute a pivot for the upper ends of the front links 31. The dogs 66 and 67 are so disposed as to engage the rod 34 at points substantially equal distances from the longitudinal center of the load supporting means as above described, thereby avoiding the application of twisting strains to the load supporting means or to the frame when the load supporting means is in an elevated position.

In operation the truck with the load supporting means in lowered position is backed beneath the platform containing the articles to be transported or beneath the article itself when supported upon legs or blocks. When the load to be lifted is heavy the operator places his foot upon the pedal 45 and jumps, or otherwise projects his full weight upon the pedal, thereby exerting the increased force of the momentum of his body to the pedal. As the pedal is depressed by the force thus projected upon it, the short arms 46 and 47 of the lifting lever force the pawls 46 and 49 forwardly and upwardly causing the shoulders 51 of the pawls to engage the end portions of the rod 34, thereby exerting directly a lifting force upwardly and forwardly upon the load supporting means and causing the parallel links to swing forwardly upon their pivots. The increased force produced by the impetus of the weight of the operator readily moves the upper ends of the links through the more vertical portions of the arc of their movements and the progressively increasing effective leverage of the lifting lever as its longer arm approaches more nearly the horizontal and the arc of movement of the upper pivots of the links approach horizontal, is ample to continue the lifting movement of the load supporting means during the remainder of the movement of the lifting lever.

The lifting lever may be depressed until the pedal end thereof engages the floor, at which time the tooth 68 of the locking dog will engage the rod 34, which forms the pivot for the upper ends of the front links, thereby locking the load supporting means at the end of its first step of elevation. The lifting lever may then be released and when released will be drawn by the spring 53 to its normal raised position. As the lifting lever is thus raised by the spring the shoulders 50 in the pawls 48 and 49 will engage the rod 34 so that upon subsequent downward pressure of the lifting lever by the foot of the operator, the shoulders 50 will engage the rod 34 and again exert an upward and forward thrust upon the front end of the load supporting means, thus raising the same to its maximum elevation in which the front links 31 are approximately vertical. During the further upward and forward movement of the load supporting means thus described the rod 34 engages the inclined faces 70 of the teeth 69 and riding under them raise the dogs until at the end of the upward and forward movement of the rod 34 it is engaged by the teeth 69 and locked in elevated position, as shown in Fig. 2.

The loaded truck is then in position to be transported to its destination.

In order to provide for lifting exceedingly heavy loads, the shaft 44 may be extended, as illustrated in Fig. 3, sufficiently to enable a bar 71 to be placed beneath it and across the top of the pedal 45, so that an increased leverage may be applied to the pedal sufficiently to lift any load within the capacity of the truck.

Upon reaching its destination the operator places his foot upon the pedal 58 of the locking dog and depresses the same, thereby releasing the locking dogs from engagement with the rod 34 and permitting the descent of the load supporting means. By rotatably mounting the rod 34 in the extensions 30 of the head of the load supporting means, a slight rotation of the rod 34 is permitted during the lifting of the truck which reduces friction and prevents wear upon particular portions of said rod. The rotatability of this rod also facilitates the release of the locking dogs when the load supporting means is in elevated position, and in turn avoids undue wear upon the portions of the rod engaged by the teeth of the locking dog.

Rapid descent of the load supporting means is prevented by the dash pot 27.

It will be noted that the dash pot in the present embodiment of the invention is in a substantially vertical position so that leakage of the fluid is effectively prevented.

It will be obvious to those skilled in the art that the elevating truck above described is of economical construction; that the parts are of a rigid character, and that the force which may be applied by projecting the weight of the operator upon the pedal, in the manner above described, is far greater than could be otherwise applied by an operator of hand levers, such as tongues, of equal length.

Trucks embodying the present invention may be provided with shorter steering tongues than those of like capacity heretofore constructed, thereby greatly adding to the convenience of manipulation of the truck. Such shorter tongues will also enable the operator when standing upon the pedal of the lifting lever and grasping the usual transverse handles of the tongue to exert a pull upon the handles which will increase the force applied by his weight to the lifting lever.

In view of the fact that the lifting mechanism is wholly detached from the load supporting means, when the load supporting means is in elevated position, there is no danger to the operator by a "flying tongue" when the locking device is released to permit the descent of the load.

A further safety against injury to the operator is provided by reason of the fact that in lifting the load the operator throws his weight upon the pedal and not against the tongue, thus avoiding injuries which have some times occurred by failure of the tongue properly to engage the lifting mechanism which will permit the operator to fall backwardly as he exerts the initial pull upon the tongue to lift the load.

It will also be recognized by those skilled in the art that the application of lifting forces symmetrically with respect to the longitudinal axis of the load supporting means, and also the locking of the load supporting means at points equidistant from the longitudinal axis of the load supporting means will avoid distortion of the load supporting means and of the truck, thereby increasing its length of life.

It will be understood that the particular embodiment of the invention disclosed herein is of an illustrative character and is not restrictive, and that various changes in form, construction and arrangement of parts may be made within the spirit and scope of the following claims.

Having thus described the invention, what is claimed as new, and desired to be secured by Letters Patent, is:

1. An elevating truck comprising a frame, load supporting means movable longitudinally relatively thereto, means operable upon longitudinal movement of said load supporting means to move the same vertically relatively to said frame and mechanism for moving said load supporting means longitudinally including a foot lever fulcrumed upon said frame having a pedal so positioned as to permit the operator to protect his full weight upon it, and a pawl operable by the depression of said pedal having means detachably to engage said load supporting means and move the same longitudinally of the said frame.

2. An elevating truck comprising a frame, load supporting means connected thereto by parallel links and mechanism for lifting said load supporting means including a foot lever fulcrumed beneath said load supporting means having a pedal so positioned as to permit the operator to project his full weight upon it and a pawl, operable by the depression of said pedal, having means detachably to engage said load supporting means and move the same longitudinally of said frame.

3. An elevating truck comprising a frame, steering mechanism, load supporting means, and parallel links connecting said load supporting means to said frame, a foot lever fulcrumed on said frame beneath said load supporting means and having a pedal so positioned as to permit the operator to project his full weight upon it and means operable by the depression of said pedal to exert a thrust upon one end of said load supporting means at an angle to the horizontal acting both to lift said end and to move said load supporting means longitudinally of the frame whereby the initial lifting force applied by the momentum of the full weight of the operator to said pedal to start the lifting mechanism from a position of rest will exceed that produced by the static application of the weight of the operator alone to said foot lever.

4. An elevating truck comprising a frame, steering mechanism, load supporting means and means operable upon relative longitudinal movement of said load supporting means and said frame to raise said load supporting means, a foot lever fulcrumed on said frame below said load supporting means to swing vertically and means operable by the depression of said lever to exert force upon one end of said load supporting means at an angle inclined to the horizontal and at points substantially equidistant from the longitudinal axis of said load supporting means acting to lift said end and move said load supporting means longitudinally of the frame and avoiding racking strains during the lifting of said load supporting means.

5. An elevating truck comprising a frame, steering mechanism, load supporting means and means operable upon relative longitudinal movement of said load supporting means and said frame to raise said load supporting means, a foot lever fulcrumed on said frame below said load supporting means to swing vertically and means operable by the depression of said lever to exert force upon one end of said load supporting means at an angle to the horizontal and at points substantially equidistant from the longitudinal axis of said load supporting means acting both to lift said end and move said load supporting means longitudinally of the frame and cooperating locking means on said load supporting means and frame positioned mutually to engage at points substantially equidistant from the longitudinal axis of said load supporting means whereby racking strains will be avoided.

6. An elevating truck comprising a frame, steering mechanism, load supporting means and means operable upon relative longitudinal movement of said load supporting means and said frame to raise said load supporting means, a foot lever fulcrumed on said frame beneath said load supporting means to swing vertically, a pawl pivotally mounted on the short arm of said lever having means detachably to engage said load supporting means operable upon depression of said lever to exert a force upon an end of said load supporting means at an angle to the horizontal acting both to lift said end and to move said end longitudinally of said frame and releasable locking means for holding said load supporting means in elevated position.

7. An elevating truck comprising a frame, steering mechanism, load supporting means and means operable upon relative longitudinal movement of said load supporting means and said frame to raise said load supporting means, a foot lever fulcrumed on said frame beneath said load supporting means to swing vertically, a pawl pivotally mounted on the short end of said lever having means detachably to engage said load supporting means operable upon depression of said lever to exert a force upon an end of said load supporting means at an angle to the horizontal acting both to lift said end and to move said end longitudinally of said frame and releasable locking means for holding said load supporting means in elevated position and a dash pot connected to said load supporting means and said frame acting to prevent rapid descent of said load supporting means upon release of said locking means.

8. An elevating truck comprising a frame, load supporting mechanism, parallel links pivotally connected to said frame and said load supporting means, the pivots of said front pair of links extending beyond said links, a foot lever having a rigid fulcrum-shaft journalled in said frame, short lever arms rigid with said shaft located substantially equidistant from the longitudinal axis of said load supporting means, pawls pivotally connected to said short lever arms detachably engaging the extended pivots of said front links operable upon depression of said foot lever to elevate said load supporting means, and releasable means for locking said load supporting means in a predetermined elevated position.

9. An elevating truck comprising a frame, load supporting means, parallel links pivotally connected to said frame and said load supporting means, the pivots of said front pair of links extending beyond said links, a foot lever having a rigid fulcrum-shaft journalled in said frame, short lever arms rigid with said shaft located substantially equidistant from the longitudinal axis of said load supporting means, pawls pivotally connected to said short lever arms having a plurality of teeth detachably engaging the extended pivots of said front links operable upon successive depressions of said foot lever to elevate said load supporting means step by step, means for locking said load supporting means at each step of elevation and means for raising said foot lever when the load supporting means is in locked position to move said pawls out of effective engagement with said pivot extensions.

10. An elevating truck comprising a frame, load supporting mechanism, parallel links pivotally connected to said frame and said load supporting means, the pivots of said front pair of links extending beyond said links, a foot lever having a rigid fulcrum-shaft journalled in said frame, short lever arms rigid with said shaft located substantially equidistant from the longitudinal axis of said load supporting means, pawls pivotally connected to said short lever arms detachably engaging the extended pivots of said front links operable upon depression of said foot lever to elevate said load supporting means, releasable means for locking said load supporting means in a predetermined elevated position, and a substantially vertical dash pot closed at its bottom having its piston and cylinder pivotally connected respectively to said load supporting means and to said frame.

11. An elevating truck comprising a frame, load supporting mechanism, parallel links pivotally connected to said frame and said load supporting means, the pivots of said front pair of links extending beyond said links, a foot lever having a rigid fulcrum-shaft journalled in said frame, short lever arms rigid with said shaft located substantially equidistant from the longitudinal axis of said load supporting means, pawls pivotally connected to said short lever arms detachably engaging the extended pivots of said front links operable upon depression of said foot lever to elevate said load supporting means, and a foot-operated lock pivotally mounted on said frame having toothed dogs positioned detachably to engage the extended pivots of said front links at substantially equal distances from the longitudinal axis of the load supporting means.

12. An elevating truck comprising a frame, load supporting means, parallel links pivotally connected to said frame and said load supporting means, the pivots of said front pair of links extending beyond said links, a foot lever having a rigid fulcrum-shaft journalled in said frame, short lever arms rigid with said shaft located substantially equidistant from the longitudinal axis of said load supporting means, pawls pivotally connected to said short lever arms having a plurality of teeth detachably engaging the extended pivots of said front links operable upon successive depressions of said foot lever to elevate said load supporting means step by step, and a foot-operated lever pivotally mounted on said frame having dogs resting by gravity on the extended pivots of said front links and provided with a plurality of teeth adapted respectively to engage said pivots upon successive steps of elevation of said load supporting means.

13. An elevating truck comprising a frame having a narrow head, steering mechanism mounted in said head, side bars extending rearwardly from said head in substantial parallelism, an axle mounted in the rear portion of said side bars, wheels mounted on said axle outside of said side bars, load supporting means of relatively greater width than said frame supported by parallel links thereupon, a foot lever mounted on said frame and means operable by the depression of said foot lever detachably to engage said load supporting means at points outside of said frame at points equidistant from the longitudinal axis of the frame, and means for locking the load supporting means in elevated position upon actuation of said foot lever.

14. An elevating truck comprising a frame, load supporting means having a transverse horizontal shaft rotatably mounted in the front end thereof, parallel links pivotally connected to said frame and to said shaft, a foot lever having a rigid fulcrum-shaft journalled on said frame below said load supporting means with similar short lever arms rigid with said fulcrum shaft, pawls pivotally mounted on the respective lever arms provided with shoulders to engage said platform shaft upon actuation of said foot lever to raise said load supporting means and a locking dog pivotally mounted on said frame having shoulders to engage said rotatable platform shaft when the load supporting means is raised to a predetermined height.

15. An elevating truck comprising a frame, load supporting means, parallel links connected to said load supporting means and said frame, a foot lever having a rigid fulcrumed shaft journalled in said frame below said load supporting means having at the end of its long arm a pedal and means connected to its short arm operable to engage the front end of said load supporting means and exert a force upon the front end of the load supporting means at an angle to the horizontal acting both to lift said end and to move said load supporting means longitudinally of the frame, and an extension of said fulcrumed shaft adapted to permit the insertion therebeneath of a bar resting upon said pedal, whereby a maximum force may be applied to said pedal by the weight of the operator to raise an excessively heavy load.

In testimony whereof, I have signed my name to this specification.

DANIEL E. HENNESSY.

CERTIFICATE OF CORRECTION.

Patent No. 1,867,825.　　　　　　　　　　　　　　　　July 19, 1932.

DANIEL E. HENNESSY.

It is hereby certified that error appears in the printed specification of the above numbered patent requiring correction as follows: Page 5, line 119, claim 4, before "lift" insert the words both to; and that the said Letters Patent should be read with this correction therein that the same may conform to the record of the case in the Patent Office.

Signed and sealed this 4th day of October, A. D. 1932.

(Seal)

M. J. Moore,
Acting Commissioner of Patents.